G. G. EIDMAN.
HARNESS ATTACHMENT.
APPLICATION FILED OCT. 6, 1915.
1,197,921.
Patented Sept. 12, 1916.
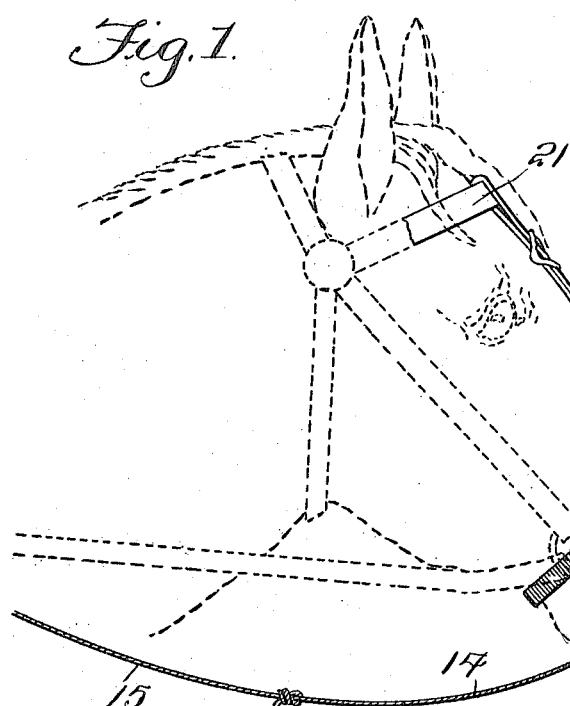
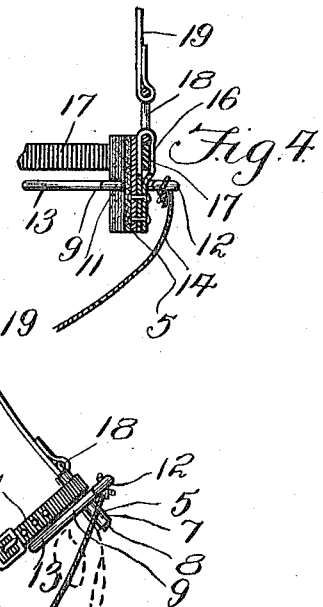
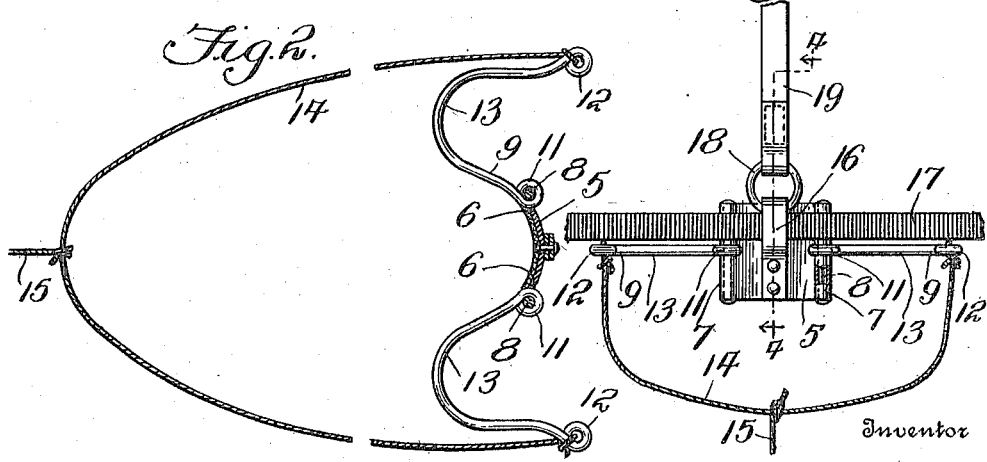
Inventor
G. G. Eidman
By Victor J. Evans
Attorney
Witnesses

UNITED STATES PATENT OFFICE.

GUY G. EIDMAN, OF BAY CITY, TEXAS.

HARNESS ATTACHMENT.

1,197,921.  Specification of Letters Patent.  Patented Sept. 12, 1916.

Application filed October 6, 1915.   Serial No. 54,425.

*To all whom it may concern:*

Be it known that I, GUY G. EIDMAN, a citizen of the United States, residing at Bay City, in the county of Matagorda and State of Texas, have invented new and useful Improvements in Harness Attachments, of which the following is a specification.

This invention contemplates the provision of a device by means of which the nostrils of an animal may be effectively closed when desired, to cut off his wind with a view of preventing the animal from running away.

The invention consists of a new article of manufacture in the nature of an attachment which can be readily and easily associated with or removed from the head of the animal when desired, and when in position for use, can be quickly and positively operated for the purpose intended.

Other objects will appear as the nature of the invention is better understood from the following description, wherein the specific construction, combination and arrangement of parts are more fully described and claimed.

In the drawing forming part of this application like numerals of reference indicate similar parts in the several views, and wherein:—

Figure 1 is a perspective view of the device showing the same in position for use; and Fig. 2 is a sectional plan view. Fig. 3 is a top plan view. Fig. 4 is a sectional view taken on line 4—4 of Fig. 3.

As shown in one embodiment of my invention, the device consists of an oblong longitudinally curved plate 5 constituting a base, the latter being slotted at its opposite end in alinement with the longitudinal center as at 6, the separated portions of the plate defined by the slots being rolled back to provide alined knuckles 7 which immovably receive the pivot bolts 8.

A pair of companion members 9 are employed, each preferably consisting of a strand of wire curved throughout its length into substantially U-form, and terminating at both ends to provide eyes 11 and 12 respectively. The members 9 are oppositely disposed with relation to each other so that the intermediate portions 13 normally engage the nostrils of the animal and coöperate to cut off his wind in the manner and for the purpose to be presently described.

The adjacent eyes 11 of the members loosely embrace the bolts 8 and are thereby mounted for swinging movement. The eyes 12 on the opposite extremities of each member have associated therewith the strands 14 of cord or other suitable material, and which latter are connected to a single operating line 15 that leads to a point within convenient reach of the driver.

Secured to the upper face of the plate 5 is a loop 16 through which is extended a strap 17, the latter being passed around the lower jaw of the animal, and preferably constructed of elastic material to permit freedom of movement of the jaws. Associated with the loop 16 is a ring 18 to which one end of the strap 19 is connected, the latter having its opposite end detachably connected with the brow strap 21 of the harness, the strap 19 coöperating with the strap 17 for supporting the device in operative position upon the head of the animal. By reason of the construction and relative arrangement of the parts hereinabove set forth it will be manifest, that when the operating line 15 is pulled upon in the direction of the driver, the members 9 are effectively moved toward each other against the nostrils of the animal, thereby closing the same with the consequent cutting off of his wind and the checking of his speed, thereby preventing the animal from running away under any circumstances.

It is believed that the nature and advantages of the invention will be thoroughly understood from the foregoing description, however I desire to have it understood that I do not limit myself to the precise construction and arrangement of parts herein shown and described, as the same is merely illustrative of one embodiment of the invention and various changes may be resorted to when desired as fall within the scope of the appended claim.

What is claimed is:—

A device of the class described comprising a curved plate slotted at both ends, the separated portions defined by said slots being formed to provide alined knuckles, a pivot bolt fitted therein, a pair of relatively movable nostril engaging members pivotally associated with said bolts, an operating element connected with the free ends of said members, a padding secured to one side of the plate, an elongated strip terminally secured to the opposite side of the plate adjacent the lower edge thereof, and offset from its point of connection with said plate in spaced relation thereto, said offset portion being bent inwardly to provide a loop and having its free end engaging said plate, an elastic band passed through said loop, and a ring arranged within said loop above said band for the purpose described.

In testimony whereof I affix my signature in presence of two witnesses.

GUY G. EIDMAN.

Witnesses:
T. W. HUBBARD,
JOSEPH SLYE.

Copies of this patent may be obtained for five cents each, by addressing the "Commissioner of Patents. Washington, D. C."